US010654560B2

(12) United States Patent
Chung et al.

(10) Patent No.: US 10,654,560 B2
(45) Date of Patent: May 19, 2020

(54) CONTROL SURFACE TRANSITIONING FOR HYBRID VTOL AIRCRAFT

(71) Applicant: Textron Innovations Inc., Fort Worth, TX (US)

(72) Inventors: Stephen Yibum Chung, Euless, TX (US); Matthew E. Louis, Fort Worth, TX (US)

(73) Assignee: TEXTRON INNOVATIONS INC., Fort Worth, TX (US)

( * ) Notice: Subject to any disclaimer, the term of this patent is extended or adjusted under 35 U.S.C. 154(b) by 284 days.

(21) Appl. No.: 15/880,216

(22) Filed: Jan. 25, 2018

(65) Prior Publication Data

US 2019/0225321 A1 Jul. 25, 2019

(51) Int. Cl.
*G01C 23/00* (2006.01)
*B64C 13/04* (2006.01)
*B64C 29/00* (2006.01)
*B64C 27/04* (2006.01)

(52) U.S. Cl.
CPC ............ *B64C 13/044* (2018.01); *B64C 27/04* (2013.01); *B64C 29/0033* (2013.01)

(58) Field of Classification Search
CPC .... B64C 13/044; B64C 27/04; B64C 29/0033
See application file for complete search history.

(56) References Cited

U.S. PATENT DOCUMENTS

| 2014/0288731 | A1* | 9/2014 | Hagerott | ................... B64C 9/04 701/3 |
| 2018/0004229 | A1 | 1/2018 | White | |
| 2018/0086431 | A1* | 3/2018 | Beaufrere | ................ B64C 5/02 |

OTHER PUBLICATIONS

Miller, et al., "Tiltrotor Modelling for Simulation in Various Flight Conditions," Journal of Theoretical and Applied Mechanics 44, 4, pp. 881-906, Warsaw 2006; http://warminski.pollub.plwww.ptmts.org.pl/jtam/index.php/jtam/article/view/v44n4p881/499.

* cited by examiner

*Primary Examiner* — Adam M Alharbi
(74) *Attorney, Agent, or Firm* — Patent Capital Group

(57) ABSTRACT

One embodiment is a method including defining a maximum deflection for a first axis of a control surface axis of an aircraft; defining a maximum deflection for a second axis of the control surface; and creating a graphical representation of the maximum deflection for the first and second control surface axes. The method further includes determining an angle of rotation of a structure on which the control surface is carried, wherein the angle of rotation is relative to a body of the aircraft; rotating the graphical representation in accordance with the determined angle of rotation; calculating a distance between a point representing a selected combination of roll moment and yaw moment and each edge of the graphical representation; and calculating a control surface deflection based on the calculated distances.

16 Claims, 5 Drawing Sheets

CONTROL SURFACE TRANSITIONING FOR HYBRID VTOL AIRCRAFT

TECHNICAL FIELD

This disclosure relates generally to hybrid vertical take-off and landing (VOTL) aircraft and, more particularly, to control surface transitioning for such aircraft.

BACKGROUND

A vertical take-off and landing (VTOL) aircraft is one that can take off, hover, and land vertically. This classification of aircraft can include a variety of types of aircraft, including tiltrotor aircraft. Tiltrotor aircraft are aircraft that generate lift and propulsion by way of one or more powered rotors (sometimes referred to as "proprotors") mounted on rotating engine pods, or "nacelles," usually located at the ends of a fixed wing or an engine mounted in the fuselage with drive shafts transferring power to rotor assemblies mounted on the wingtips. Tiltrotor aircraft combine the vertical lift capability of a helicopter with the speed and range of a conventional fixed-wing aircraft. For vertical flight, the rotors are angled so the plane of rotation is horizontal, lifting the way a helicopter rotor does. As the aircraft gains speed, the rotors are progressively tilted forward, with the plane of rotation eventually becoming vertical. In this mode, the wing provides the lift and the rotor provides thrust as a propeller. Since the rotors can be configured to be more efficient for propulsion (e.g. with root-tip twist) and it avoids a helicopter's issues of retreating blade stall, tiltrotor aircraft can achieve higher speeds than helicopters.

SUMMARY

One embodiment is a method including defining a maximum deflection for a first axis of a control surface axis of an aircraft; defining a maximum deflection for a second axis of the control surface; and creating a graphical representation of the maximum deflection for the first and second control surface axes. The method further includes determining an angle of rotation of a structure on which the control surface is carried, wherein the angle of rotation is relative to a body of the aircraft; rotating the graphical representation in accordance with the determined angle of rotation; calculating a distance between a point representing a selected combination of roll moment and yaw moment and each edge of the graphical representation; and calculating a control surface deflection based on the calculated distances. Other embodiments include providing at least one a control signal to the control surface to control positioning of the control surface based on the calculated control surface deflection; and/or receiving control inputs indicative of the selected combination of roll and yaw moments. In certain embodiments, the control inputs are generated by a pilot using at least one of a cyclic, a collective, and pedals.

In some embodiments the graphical representation comprises a rectangle and/or the control surface comprises a rotor blade. The structure on which the control surface is carried may be a mast rotatable between first and second positions relative to the aircraft body. In certain embodiments, when the mast is in the first position, the angle of rotation is zero degrees and when the mast is in the second position, the angle of rotation is 90 degrees. The first position may include an airplane mode and the second position may include a helicopter mode.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Figure 1:
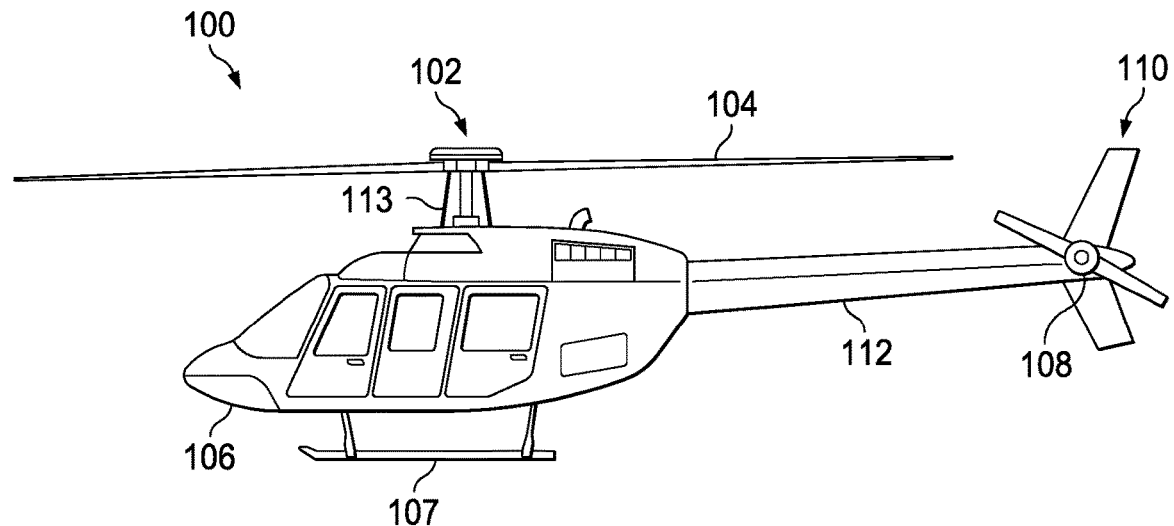
FIG. 1 is a schematic illustration of an example aircraft in accordance with embodiments of the present disclosure.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

FIG. 1 illustrates an example embodiment of a rotorcraft 100. The illustrated example portrays a side view of rotorcraft 100. Rotorcraft 100 includes a rotor system 102 with a plurality of rotor blades 104. The pitch of each rotor blade 104 can be managed or adjusted in order to selectively control direction, thrust, and lift of rotorcraft 100. Rotorcraft 100 further includes a fuselage 106, tail rotor or anti-torque system 108, an empennage 110, and a tail structure 112. In the illustrated embodiment, tail structure 112 may be used as a horizontal stabilizer. Torque is supplied to rotor system 102 and anti-torque system 108 using at least one engine or electric motor.

Figure 2:
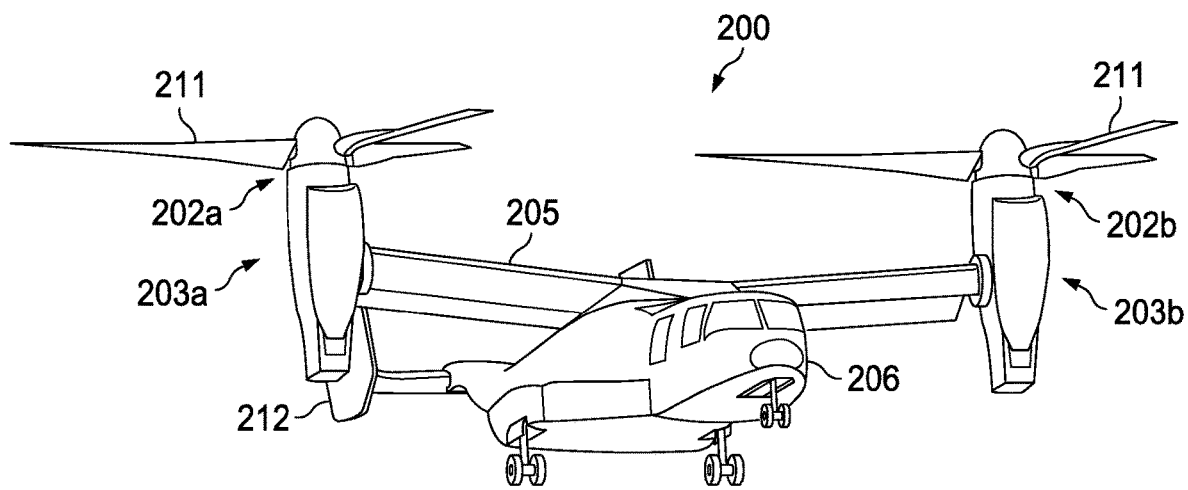
FIG. 2 is a schematic illustration of an example tiltrotor aircraft in accordance with embodiments of the present disclosure.

FIG. 2 illustrates a perspective view of an example tiltrotor aircraft 200. Tiltrotor aircraft 200 includes nacelles 203a and 203b, a wing 205, a fuselage 206, and a tail structure 212. Nacelles 203a and 203b respectively include rotor systems 202a and 202b, and each rotor system 202a and 202b includes a plurality of rotor blades 211. Moreover, each nacelle 203a and 203b may include an engine and gearbox for driving rotor systems 202a and 202b, respectively. In some embodiments, nacelles 203a and 203b may each be configured to rotate between a helicopter mode, in which the nacelles 203a and 203b are approximately vertical, and an airplane mode, in which the nacelles 203a and 203b are approximately horizontal. In the illustrated embodiment, tail structure 212 may be used as a vertical stabilizer.

It should be appreciated that rotorcraft 100 of FIG. 1 and tiltrotor aircraft 200 of FIG. 2 are merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

An aircraft pilot manipulates flight controls to achieve and maintain aerodynamic flight. In particular, changes input by the pilot to the flight control system are transmitted to the rotors, producing aerodynamic effects on the rotor blades that make the aircraft move in a particular way. A typical rotorcraft has three flight control inputs, including a cyclic, a collective, and pedals. The control inputs are processed by the control system and sent to the control surfaces to achieve the desired results.

Tiltrotor aircraft, hybrid VTOL aircraft, as well as other types of aircraft, use control laws for transitioning between rotor-borne flight and wing-borne flight. The period of time during which aircraft is transitioning from one type of flight to another is referred to herein as a "transition period." Control laws allow for the aircraft to mix the control surfaces, such as rotor blades, properly to achieve appropriate roll and yaw control throughout the transition period, but can involve solving a complex set of equations quickly and repeatedly. These equations can be computationally resource intensive, and can also use a significant amount of coding memory.

Figure 3A:
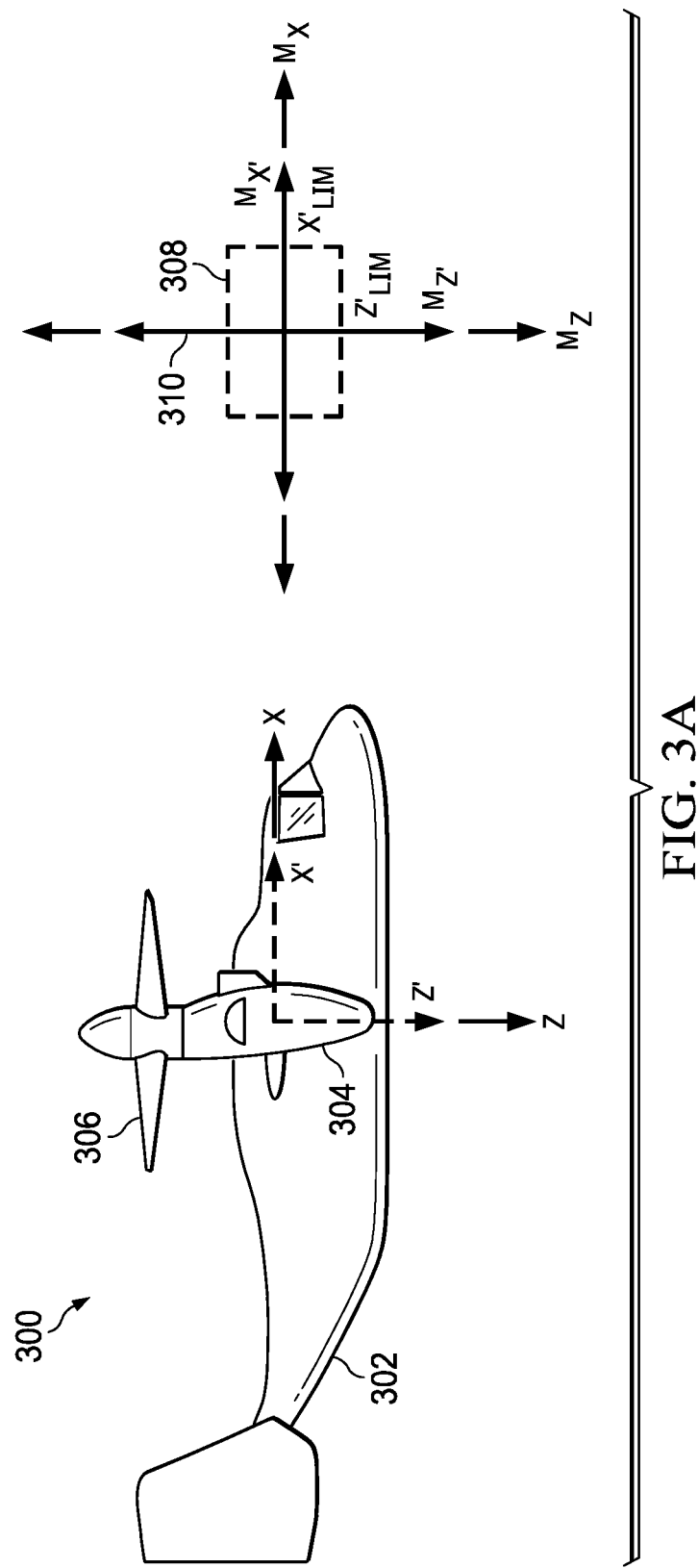
FIGS. 3A-C collectively illustrate transition of a tiltrotor aircraft from a helicopter mode (FIG. 3A) to an airplane mode (FIG. 3B), through a transition period during which the aircraft is in a transition mode (FIG. 3C)
Figure 3B:
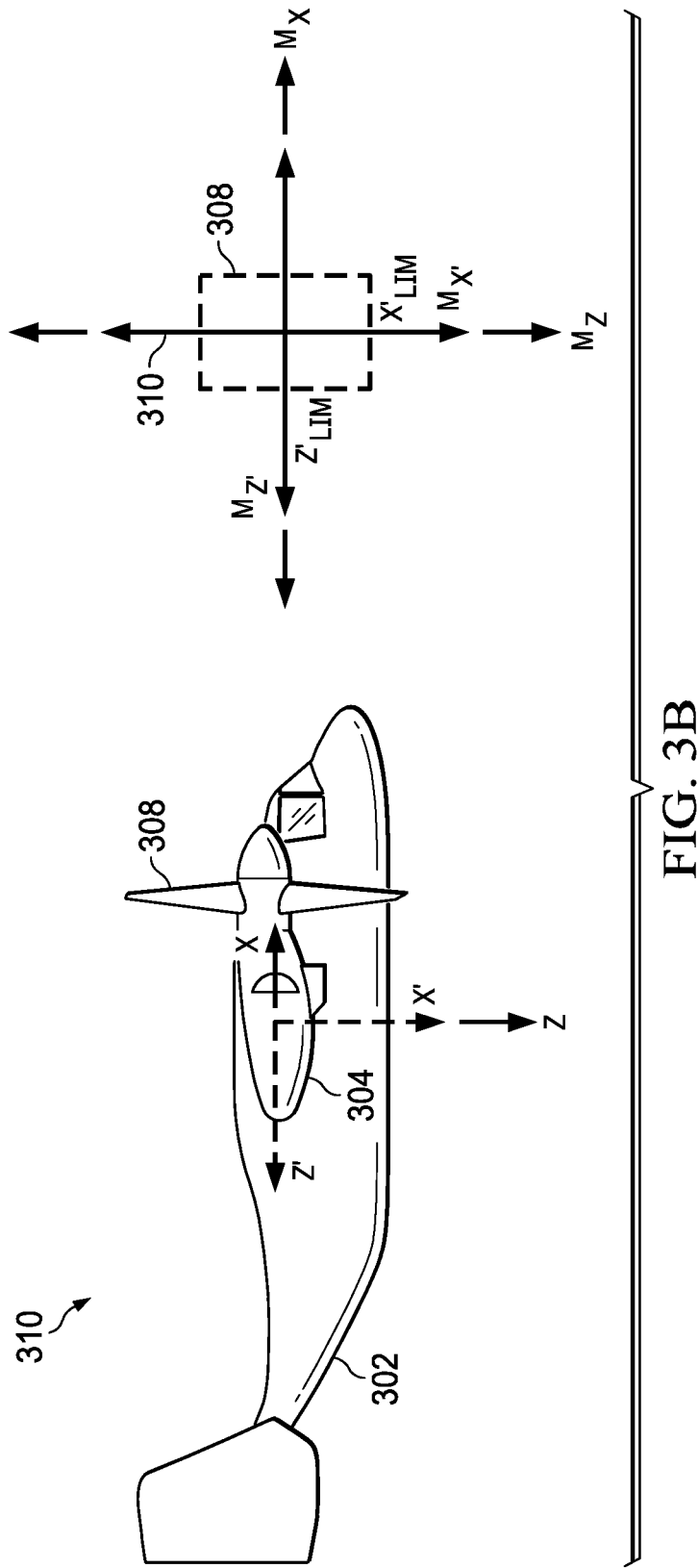
Figure 3C:
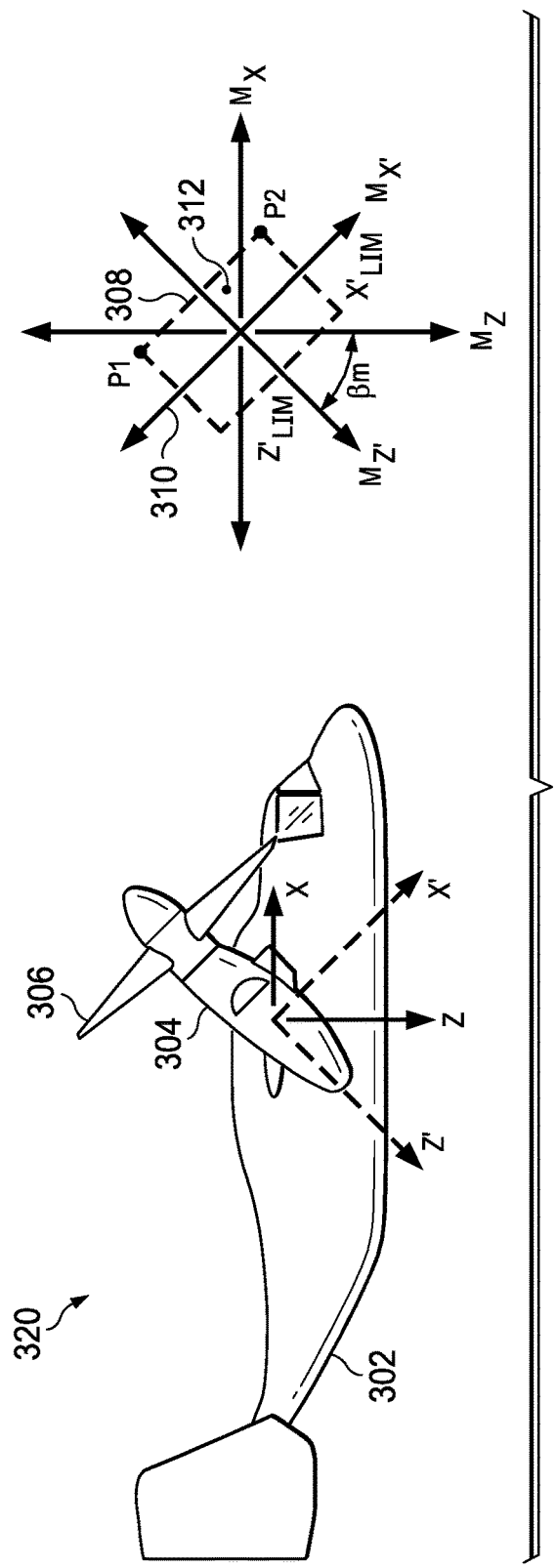

Aspects of the embodiments described herein involve creating and utilizing a graphical representation of the solution to the complex set of equations and utilizing graphical representations of control surface maxima to define the control surface mixing to avoid having to perform complex calculations during a transition period. The moment balance required to perform roll (X)/yaw (Z) mixing during a transition period can be represented graphically using a desired Mx moment vs. desired Mz moment diagram bounded by a box representative of the control surfaces'  maximum deflections. Control surface deflections may be limited by the physical limitations of the airframe and control system (structure, motion mechanics, actuators, etc.). These maxima may be artificial and be designed to protect components and/or the airframe in certain portions of the envelope. FIGS. 3A-C collectively illustrate transition of an aircraft from a helicopter mode (in FIG. 3A) to an airplane mode (in FIG. 3B), through via a transition period during which the aircraft is in a transition mode (in FIG. 3C).

In FIG. 3A, the helicopter mode 300 is shown for a tiltrotor aircraft 302. The tiltrotor aircraft can be similar to that shown in FIG. 2, and includes a pair of structures, such as a mast 304, each of which supports a rotor, such as a rotor 306. Each of the rotors, including the rotor 306, can include a control surface, such as a rotor blade, and can be supplied power by an engine system. The engine system can vary the tilt of the rotors relative to one another to cause the aircraft to roll or yaw in the helicopter mode. For example, the aircraft 302 will roll for a differential collective pitch between the two rotors. The aircraft 302 will yaw for a differential longitudinal cyclic input to the rotors.

In FIG. 3B, the airplane mode 310 is shown for the tiltrotor aircraft 302. In the airplane mode 310, the nacelles, including the mast 304, are rotated 90 degrees (or approximately 90 degrees) from the helicopter mode position illustrated in FIG. 3A to provide thrust for the aircraft 302.

In FIG. 3C, the transition mode 320 is shown for the tiltrotor aircraft 302. In the transition mode, the nacelles, including the mast 304, are rotated between 0 degrees (helicopter mode) and 90 degrees (airplane mode) and the torques, or moments, around the principle axes are balanced in the transition.

In accordance with features of embodiments described herein, the yaw and roll mixing calculations for the tiltrotor aircraft 302 can be expressed as:

$$\begin{Bmatrix} Mx \\ Mz \end{Bmatrix} = \begin{bmatrix} \cos\beta m & -\sin\beta m \\ \sin\beta m & \cos\beta m \end{bmatrix} \begin{Bmatrix} Mx' \\ Mz' \end{Bmatrix} \quad \text{[Equation 1]}$$

where:
Mx=moment in body roll axis;
Mz=moment in body yaw axis;
βm=angle between rotor mast and body;
Mx'=moment in control surface axis; and
Mz'=moment in control surface axis.

The result of Equation 1, which may be referred to as the "moment balance equation," can be graphically represented as an Mx, Mz moment diagram, as shown in FIGS. 3A-C. In each of FIGS. 3A-C, a box 308 is a representation of the control surface maximum deflection, and the x and z axes 310 coincident to the box 308. Four linear equations (y=mx+b) are used to describe the bounds of the box 308. The rotating box 308 represents the moments generated by the control surfaces at their maximum deflections. The moment generated is always the same with respect to the rotor hub center (neglecting variations from the flight conditions), but rotates relative to the fixed body reference.

Equations used to describe the box are programmed and used to calculate the proper yaw/roll surface deflections in the flight control computer. As the aircraft mast/body rotates, the box 308 representing the control surface maximum deflection rotates to represent the rotation of control surface moments and their combined response required for a desired Mx, Mz moment combination, which may be represented by a point inside the box 308. The distance equation set forth below can be used to determine how far the desired Mx, Mz point is away from the bounds of the box 308:

$$\text{Distance}(P1x, P1z), (P2x, P2z), (Mx, Mz)) = \frac{|(P2x - P1z)Mx - (P2x - P1x)Mz + P2x + P1z + P2x + P1x|}{\sqrt{(P2z - P1z)^2 + (P2x - P1x)^2}}$$

In the equation above, Mx, Mz represent the desired Mx, Mz point, while the P1 and P2 x, z points represent the collinear corners of the box as shown in FIG. 3C. The distances calculated represent the control surface deflections used to achieve the desired Mx, Mz moment, which is selected by the aircraft's pilot or autopilot and is represented in FIG. 3C by a point 312, may be located anywhere within the box.

Figure 4:
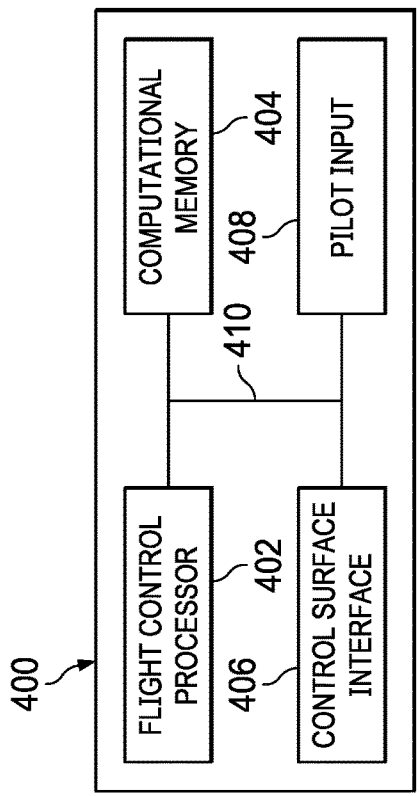
FIG. 4 is a schematic block diagram of an aircraft control system in accordance with embodiments of the present disclosure.

FIG. 4 is a schematic block diagram of an aircraft control system 400 in accordance with embodiments of the present disclosure. The aircraft control system 400 can include a flight control processor 402 and a memory 404. Flight control processor 402 can be a hardware processor that uses software and firmware to execute operations. The memory 404 can store instructions that when executed cause the flight control processor 402 to carry out operations. The aircraft control system 400 can also include a pilot input 408. Pilot input 408 can include input generated using a manual control device, an electronic control device, or a combination thereof. The pilot input 408 can be a remote signal received by the aircraft from a ground-based pilot/operator. Other pilot inputs are also contemplated, including inputs from flight controllers, including a cyclic, a collective, and pedals. The aircraft control system 400 is responsive to the intended pilot inputs. For example, during transition between rotor-borne and wing-borne flight, the pilot input can include a roll or yaw, and the aircraft control system 400 can control the control surface (through control surface interface 406) to respond to the pilot input. The control surface interface 406 can include hardware, software, or a combination of hardware and software to receive control signals and vary the control surfaces accordingly.

The system 400 may include one or more buses, such as a system bus and a memory bus, collectively represented in FIG. 400 by a bus 410, for enabling electronic communication between system components. The processor 402, which may also be referred to as a central processing unit (CPU), can include any general or special-purpose processor capable of executing machine-readable instructions and performing operations on data as instructed by the machine-readable instructions. Memory 404 may be directly accessible by the hardware processor for accessing machine-readable instructions and may be in the form of random access memory (RAM) or any type of dynamic storage (e.g., dynamic random-access memory (DRAM)). System 400 may also include non-volatile memory, such as a hard disk, that is capable of storing electronic data including executable software files. Externally stored electronic data may be provided to system 400 through one or more removable media drives, which may be configured to receive any type of external media such as compact discs (CDs), digital video discs (DVDs), flash drives, external hard drives, etc.

System 400 may also include an additional user interface to allow a user, such as a pilot, to interact with the system. Such a user interface may include a display device such as a graphical display device (e.g., plasma display panel (PDP), a liquid crystal display (LCD), a cathode ray tube (CRT), etc.). In addition, any appropriate input mechanism may also be included such as a keyboard, a touch screen, a mouse, a trackball, voice recognition, touch pad, etc. As used herein, "removable media drive" refers to a drive configured to receive any type of external computer-readable media. Instructions embodying the activities or functions described herein may be stored on one or more external computer-readable media. Additionally, such instructions may also, or alternatively, reside at least partially within a memory element (e.g., in main memory or cache memory of processor 402 during execution, or within a non-volatile memory element of system 400. Accordingly, other memory elements of system 400 also constitute computer-readable media. Thus, "computer-readable medium" is meant to include any medium that is capable of storing instructions for execution by system 400 that cause the system to perform any one or more of the activities disclosed herein.

Figure 5:
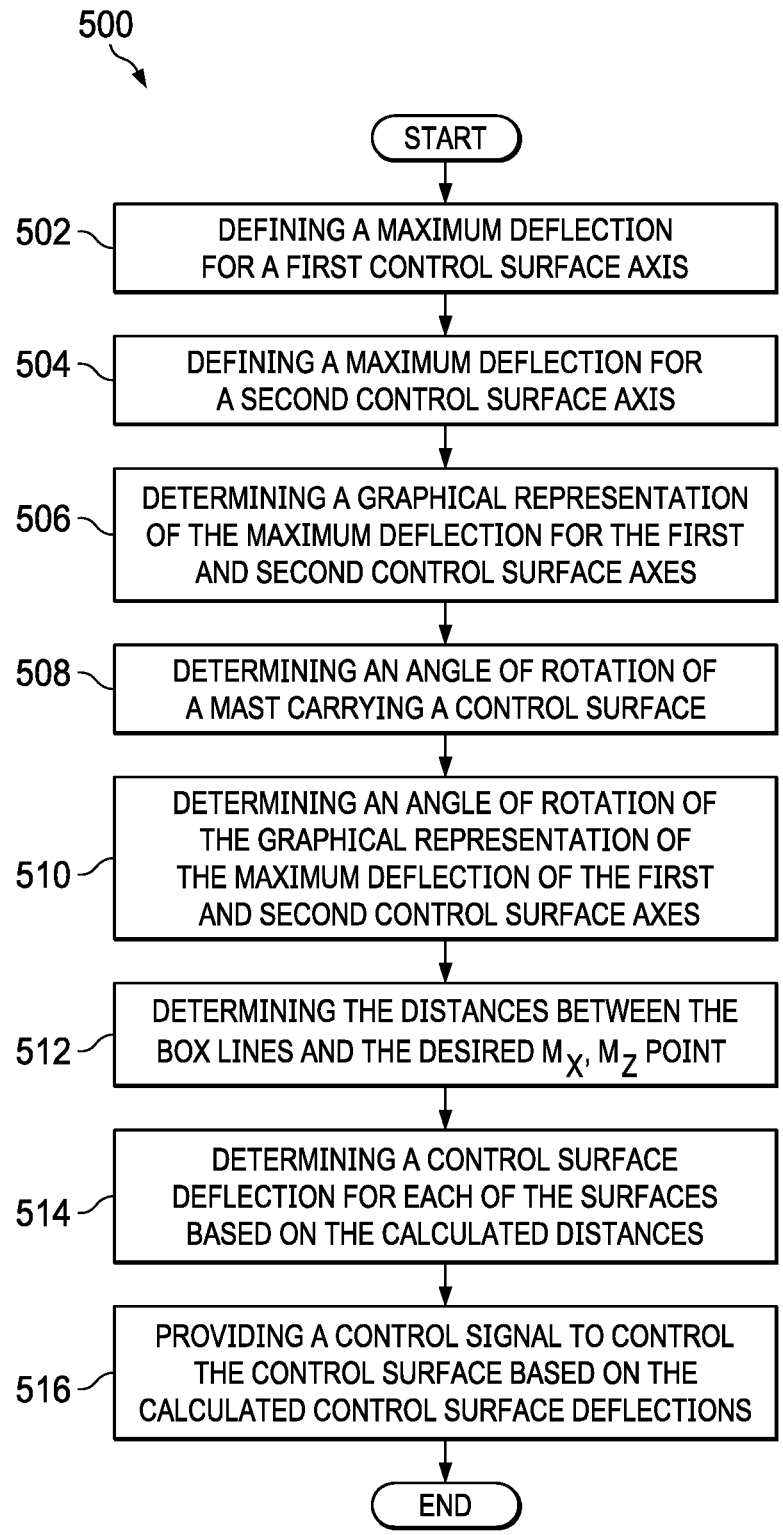
FIG. 5 illustrates a flowchart of a method for performing control surface transitioning for a tiltrotor aircraft in accordance with embodiments of the present disclosure.

The flight control processor 402 can execute instructions to perform operations to control the aircraft control surfaces. FIG. 5 is a process flow diagram for controlling an aircraft control surface in accordance with embodiments of the present disclosure. The steps illustrated in FIG. 5 may be implemented by the flight control system 400 shown in FIG. 4. A maximum deflection for a first control surface axis can be defined (502); a maximum deflection for a second control surface axis can be defined (504). The control surface maxima can be predefined or can be determined dynamically by performing a mechanical test of the control surface ranges. A graphical representation of the maximum deflection for the first and second control surface axes can be determined (506). The graphical representation can be determined based on solving a linear system of equations defining the maximum deflections of the control surface axes. Equation 1 set forth above is the linear system of equations for the example tiltrotor aircraft.

A transition can occur that sets the control surface-bearing structure to a transition point. An angle of rotation of the structure (e.g., the mast), carrying a control surface relative to the aircraft body can be determined (508). A corresponding angle of rotation of the graphical representation of the control surface maximum deflection can be determined (510). Distances from the rotated graphical deflection to the desired Mx,Mz point can be calculated (512). The distance from the desired Mx,Mz point to the representation bounds can be solved using a determination of a solution to a distance equation, as described above. A control surface deflection for each of the control surfaces can be calculated based on the distances calculated in step 512 (514). A control signal can be provided to the control surfaces based on the calculated control surface deflection (516) In particular, roll and yaw control can be determined and provided based on pilot input and the determined Mx and Mz moments.

The embodiments described throughout this disclosure provide numerous technical advantages, including a faster determination of a control surface mixing during a transition period of an aircraft between rotor-borne flight and wing-borne flight.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A method comprising:
defining a maximum deflection for a first axis of a control surface axis of an aircraft;
defining a maximum deflection for a second axis of the control surface;
creating a graphical representation of the maximum deflection for the first and second control surface axes;
determining an angle of rotation of a structure on which the control surface is carried, wherein the angle of rotation is relative to a body of the aircraft;
rotating the graphical representation in accordance with the determined angle of rotation;
calculating a distance between a point representing a selected combination of roll moment and yaw moment and each edge of the graphical representation; and
calculating a control surface deflection based on the calculated distances;
wherein the structure on which the control surface is carried is a mast rotatable between first and second positions relative to the aircraft body; and
wherein when the mast is in the first position, the angle of rotation is zero degrees and when the mast is in the second position, the angle of rotation is 90 degrees.

2. The method of claim 1 further comprising:
providing at least one a control signal to the control surface to control positioning of the control surface based on the calculated control surface deflection.

3. The method of claim 1 further comprising:
receiving control inputs indicative of the selected combination of roll and yaw moments.

4. The method of claim 3, wherein the control inputs are generated by a pilot using at least one of a cyclic, a collective, and pedals.

5. The method of claim 1, wherein the graphical representation comprises a rectangle.

6. The method of claim 1, wherein the control surface comprises a rotor blade.

7. The method of claim 1, wherein the first position comprises an airplane mode and the second position comprises a helicopter mode.

8. One or more non-transitory tangible media that includes code for execution and when executed by a processor operable to perform operations comprising:
defining a maximum deflection for a first axis of a control surface axis of an aircraft;
defining a maximum deflection for a second axis of the control surface;
creating a graphical representation of the maximum deflection for the first and second control surface axes;
determining an angle of rotation of a structure on which the control surface is carried, wherein the angle of rotation is relative to a body of the aircraft;
rotating the graphical representation in accordance with the determined angle of rotation;
calculating a distance between a point representing a selected combination of roll moment and yaw moment and each edge of the graphical representation; and
calculating a control surface deflection based on the calculated distances;
wherein the structure on which the control surface is carried is a mast rotatable between first and second positions relative to the aircraft body; and
wherein when the mast is in the first position, the angle of rotation is zero degrees and when the mast is in the second position, the angle of rotation is 90 degrees.

9. The media of claim 8, wherein the operations further comprise:
providing at least one a control signal to the control surface to control positioning of the control surface based on the calculated control surface deflection.

10. The media of claim 8, wherein the operations further comprise:
receiving control inputs indicative of the selected combination of roll and yaw moments.

11. The media of claim 10, wherein the control inputs are generated by a pilot using at least one of a cyclic, a collective, and pedals.

12. The media of claim 8, wherein the graphical representation comprises a rectangle.

13. The media of claim 8, wherein the control surface comprises a rotor blade.

14. A rotorcraft comprising:
an aircraft body;
at least one structure rotatably connected to the aircraft body, the at least one structure carrying a rotor assembly comprising at least one control surface;
a flight control system comprising a processor and a memory, the flight control system:
defining a maximum deflection for a first axis of a control surface axis of an aircraft;
defining a maximum deflection for a second axis of the control surface;
creating a graphical representation of the maximum deflection for the first and second control surface axes;

determining an angle of rotation of the structure on which the control surface is carried, wherein the angle of rotation is relative to a body of the aircraft;

rotating the graphical representation in accordance with the determined angle of rotation;

calculating a distance between a point representing a selected combination of roll moment and yaw moment and each edge of the graphical representation; and calculating a control surface deflection based on the calculated distances;

wherein the structure on which the control surface is carried is a mast rotatable between first and second positions relative to the aircraft body; and wherein when the mast is in the first position, the angle of rotation is zero degrees and when the mast is in the second position, the angle of rotation is 90 degrees.

15. The rotorcraft of claim 14, wherein the flight control system further:

provides at least one a control signal to the control surface to control positioning of the control surface based on the calculated control surface deflection; and receives control inputs indicative of the selected combination of roll and yaw moments.

16. The rotorcraft of claim 15, wherein the control inputs are generated by a pilot using at least one of a cyclic, a collective, and pedals.

\* \* \* \* \*